Oct. 18, 1927.
P. E. VAN SAUN
1,645,672
AUTOMATIC DISCONNECTING DEVICE FOR ROCK CRUSHERS
Filed May 10, 1926   2 Sheets-Sheet 1
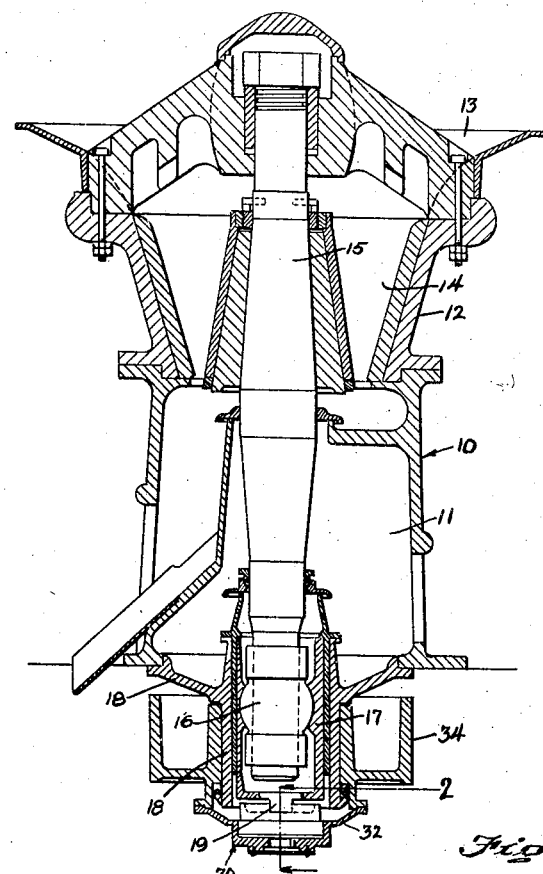
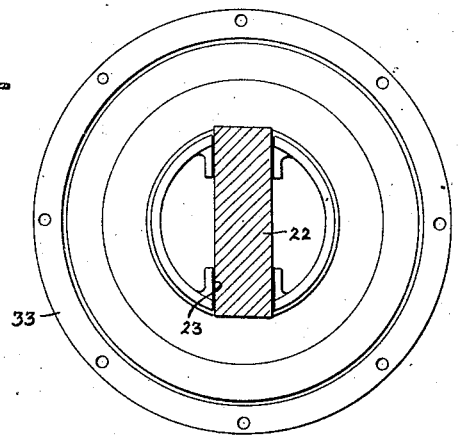
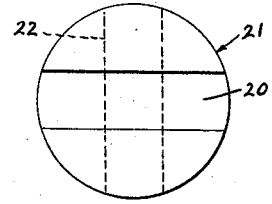
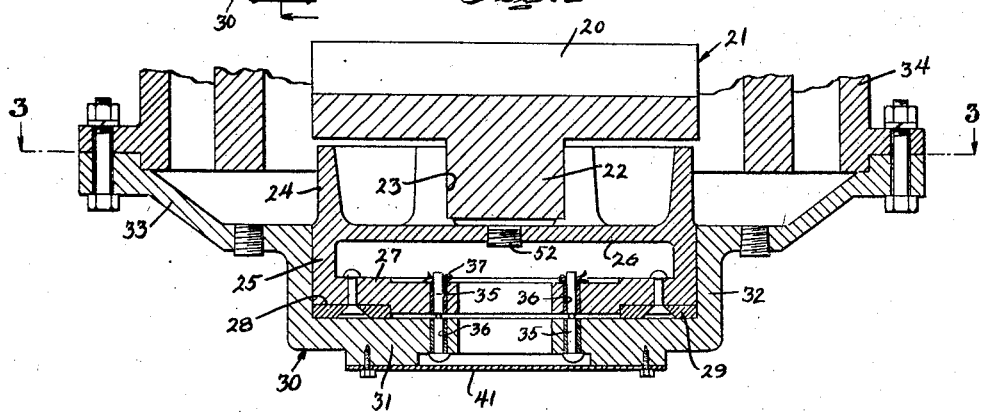
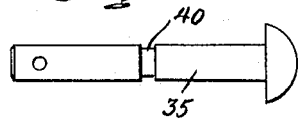
INVENTOR.
PETER EDWIN VAN SAUN
BY
Edmund A. Strout
ATTORNEY.

Oct. 18, 1927.
P. E. VAN SAUN
1,645,672
AUTOMATIC DISCONNECTING DEVICE FOR ROCK CRUSHERS
Filed May 10, 1926
2 Sheets-Sheet 2
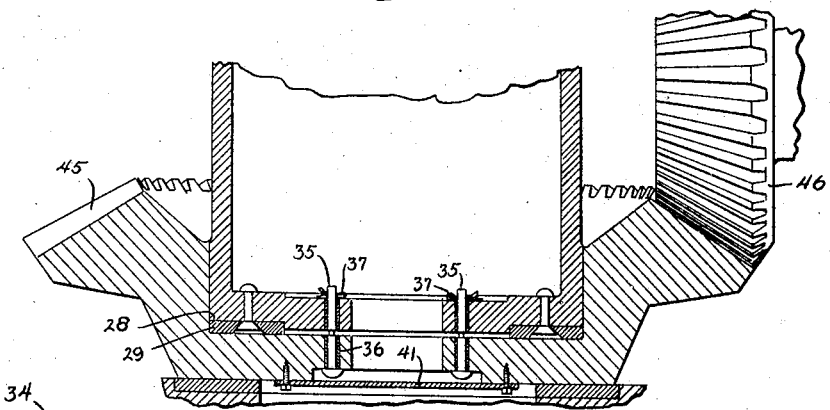
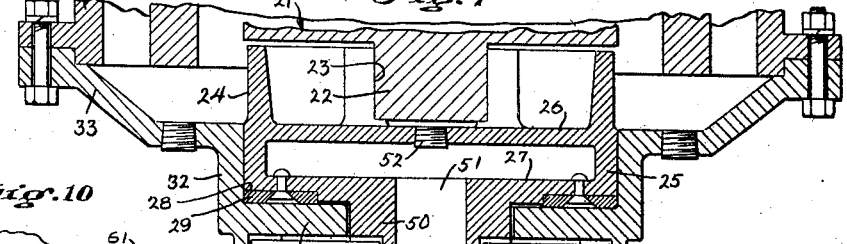
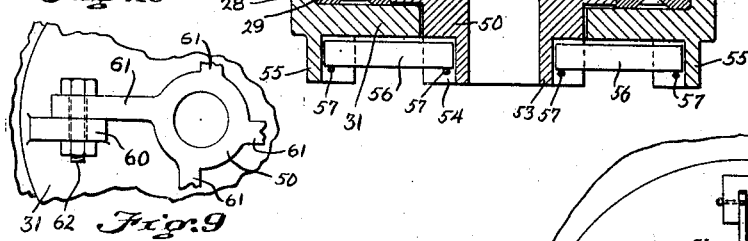
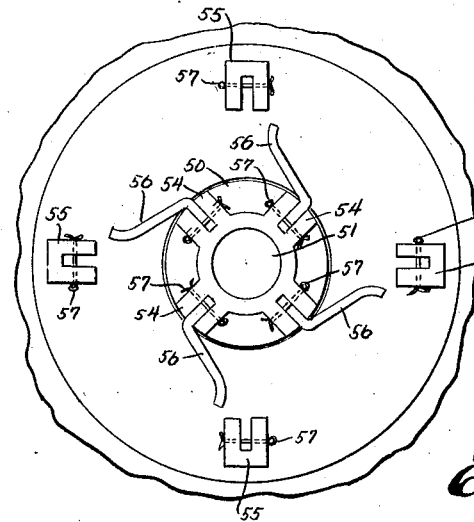
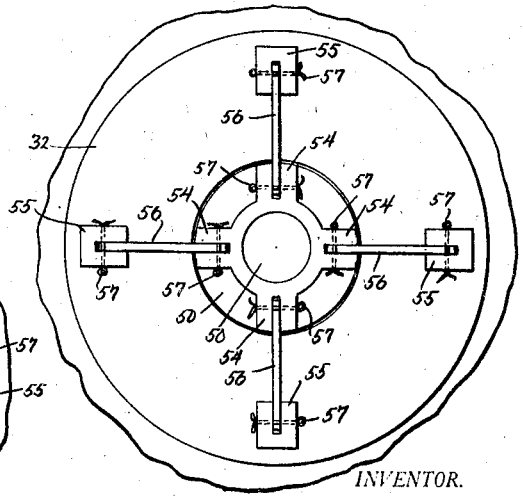
INVENTOR.
PETER EDWIN VAN SAUN
BY
Edmund A. Strauss
ATTORNEY.

Patented Oct. 18, 1927.

1,645,672

UNITED STATES PATENT OFFICE.

PETER EDWIN VAN SAUN, OF LOS ANGELES, CALIFORNIA.

AUTOMATIC DISCONNECTING DEVICE FOR ROCK CRUSHERS.

Application filed May 10, 1926. Serial No. 107,916.

This invention pertains particularly to rock crushers of the gyratory type and specifically to a frangible coupling for disconnecting the crusher's main gyratory shaft from its driving element.

An important object of the invention is to provide a coupling for connecting rock crusher main operating shafts to their driving elements that will stand a predetermined degree of strain, and on an overload will be instantly disconnected to prevent operation of the main shaft and consequent damage to the crusher mechanism.

A further object is to provide a coupling that may be readily rendered operative after a disconnection or breaking of the frangible elements.

This disclosure is to be regarded as descriptive only, and not as restrictive or limitive of the invention, of which obviously an embodiment may be constructed including many minor modifications without departing from the general scope herein indicated and hereinafter claimed.

Broadly an embodiment of the invention, which is here shown in connection with a gyratory rock crushing apparatus of usual form, consists in forming a connection between the main shaft which carries the crushing head, and its driving element. This connection consists of one or a plurality of pins here shown as having a reduced portion between their ends in order that the break will occur at such portions when an excessive strain is imposed upon the main shaft, or when uncrushable metal objects are accidentally introduced between the crushing jaws or concaves to prevent its operation.

In the drawings attached hereto and forming a part of this specification,

Fig. 1—is a central vertical section through a gearless gyratory rock crushing apparatus, showing a frangible coupling.

Fig. 2—is an enlarged vertical detail section showing the frangible coupling, taken on line 2—2 of Fig. 1.

Fig. 3—is a plan view showing the driving dog connection plate between the shaft and pulley mechanism.

Fig. 4—is a detailed plan view of the connector dog plate.

Fig. 5—is a side elevation of one of the frangible coupling pins.

Fig. 6—is an enlarged vertical section through the lower end of a gear driven gyratory crushing apparatus, the coupling being similar to the form shown on Fig. 1.

Fig. 7—is a view similar to Fig. 6 showing a modified form of coupling.

Fig. 8—is a bottom plan view of the coupling shown in Fig. 7 the bendable steel plate couplings being secured in operative relation.

Fig. 9—is a view similar to the above showing the bendable plate coupling disconnected.

Fig. 10—is a bottom plan view of a modified form of the invention as shown in Fig. 7.

Referring now more particularly to the drawings, and especially to Figs. 1 to 5 inclusive, 10, designates a standard gearless gyratory rock crushing apparatus, consisting of a heavy bottom shell 11 that carries the driving mechanism, and a top shell 12 carrying the hopper 13 at the upper end thereof, the "concaves" 14, and the main driving shaft 15 pivoted to the spider.

The lower end of the main shaft 15 is journaled in the sleeve 16 around which is mounted the eccentric 17, rotatably disposed in a bearing frame 18, suitably secured to the bottom shell 11 of the crusher. The lower end of eccentric 17 is closed and carries a flat diametrically disposed lug 19 that engages a similarly shaped slot 20 formed on the upper face of the driving dog plate 21, the under face of said plate being provided with a lug 22 similar to lug 19 that engages oppositely disposed slots 23 formed in the circular flange 24 of the upper shaft coupling member 25.

The flange 24 of this member extends below its transverse wall 26 a short distance and is provided with an inwardly extending circular flange 27 having an annular seat 28 formed at its peripheral edge for the reception of a bronze wear ring 29. Coupling member 25 is disposed in a lower coupling member 30, its inwardly extending flange 31 engaging the wear ring 29, of the upper coupling member. Extending upwardly and outwardly from the vertical circular flange 32 of the lower coupling member is a pulley connecting flange 33, that is bolted or otherwise secured to the driving pulley 34 of the crusher that is rotatably mounted on the cylindrical portion of the bearing frame 18.

The two coupling members 25, 30, are permanently secured together in driving relation by one or more frangible pins 35, that pass through bushed openings 36 in the flanges 27 and 31 of the respective upper and lower coupling members, the ends of the pins being apertured for the reception of split cotters 37, (see Fig. 2,) to hold them in place.

From the above it will be apparent that when power is applied to the crusher through the medium of the driving pulley that the two connected coupling members will rotate the eccentric sleeve 17 to impart gyration to the crusher driving shaft.

It frequently happens that during the operation of the apparatus, that metallic objects, such as spikes, excavator teeth, bolts, nuts, etc. are accidentally fed through the machine hopper along with the rock, to the crushing jaws or concaves, and as such objects are not subject to breakage like frangible materials, accidents to the apparatus were of frequent occurrence.

In order to overcome such accidental breakage and consequent damage to the apparatus, the pins 35 are designed of proper section so that they will shear at the portion 40 lying between the two flanges 27, 30 of the coupling members. This shearing portion 40 may or may not be of reduced diameter as shown. Under an excessive strain the pins will quickly break, but as the upper coupling member is nested within the lower member the main shaft and its connected parts will be held in substantial alinement so that the motive power may continue to operate after the pins have sheared and the main shaft has ceased to function.

The strength of the pins 35 may be readily and accurately determined by the capacity of the apparatus to which they are applied, and ready access to the pins may be obtained by simply removing the flat plate 41 from the under face of the lower coupling member, the broken pins may be quickly removed and new ones substituted therefor with the least delay. The cost of a breakage is merely that of the pins, which is only a small fraction of the cost of breakage of important portions of such apparatus under old methods of coupling.

In Fig. 6, the frangible coupling is shown as applied to a gear driven gyratory crusher, the pins 35, being directly connected to the eccentric and a gear driven member in exactly similar manner as in the form first described. The lower coupling member in this construction is provided with a bevelled gear 45 around its upper edge that meshes with a bevelled drive pinion 46 driven from a suitable source of power (not shown).

In Figs. 7 to 9 inclusive an entirely different form of coupling mechanism is shown. In this form the upper coupling 25 is provided with a centrally disposed cylindrical hub 50 provided with an opening 51 for the purpose of affording access to the oil drainage plug 52. This hub is provided with a reduced external end 53 and formed integrally therewith are a plurality of attaching lugs 54 arranged on the right angled diameters of the hub in oppositely disposed pairs. Formed adjacent the peripheral edge of the coupling member 31 and oppositely disposed to lugs 54, are similar lugs 55, flat plates 56 engaging the lugs on the hub and coupling members, split pins 57 holding the plates in engagement with the lugs during the operation of the crusher. These plates 56 are of sufficient strength to rigidly connect the driving members under ordinary loads and strains, but should excessive torsional strain be imposed upon the apparatus the plates will be quickly bent out of engagement with the lugs so to disconnect the coupling members as clearly shown in Fig. 9 of the drawings.

In Fig. 10 is illustrated still another form of coupling disconnecting means somewhat similar to the form illustrated in Figs. 7 to 9 inclusive, but instead of the bendable plates 56, the lugs 60 on flange 31 of the driving member 32, engage lugs 61 on the hub 50 of the driven member, bolts 62 connecting the lugs together. On an overload it will be perfectly obvious that the bolts would be parted, thus disconnecting the members.

As the plates are so positioned as to afford ready access to the same, it will be apparent that the disconnected plates may be quickly replaced by new ones in short order.

It is obvious that the forms of disconnectible couplings described may be readily applied to various forms and types of rock crushers without entailing any substantial changes in the form of such apparatus, and moreover as the connections described are inexpensive of manufacture and easy of installation the cost of the apparatus will not be materially increased.

What I claim is:

1. In a rock crushing apparatus, in combination a frame having a stationary crushing jaw, a movable crushing jaw disposed in crushing relation to said first named jaw, a shaft pivoted at its upper end for operating said movable crushing jaw, an eccentric for imparting motion to said shaft, a coupling member having a driving means, a second coupling member connected to said eccentric, and a frangible connection means for securing the couplings in driving relation to each other, said means adapted to disconnect the two coupling members when an excess strain is imparted to the apparatus.

2. In a rock crushing apparatus, in combination a frame having a stationary crushing jaw, a movable crushing jaw disposed in crushing relation to said first named jaw, a shaft for operating said movable crushing jaw, an eccentric for imparting motion to said shaft, a driving member, and a frangible connection means between the driving member and the eccentric, said means adapted to disconnect the eccentric when an excess strain is imparted to the apparatus.

3. In a crushing apparatus, in combination a pair of crushing jaws, one jaw being disposed in crushing relation to the other jaw, an eccentric for imparting motion to one of the jaws, a driving member, and a connection means between the eccentric and the driving member, said means adapted to disconnect the driving member from the eccentric when an excess strain is imparted to the apparatus.

In witness that I claim the foregoing I have hereunto subscribed my name this 30th day of April, 1926.

PETER EDWIN VAN SAUN.